United States Patent

(12) United States Patent
Choi et al.

(10) Patent No.: US 11,824,164 B2
(45) Date of Patent: Nov. 21, 2023

(54) RECHARGEABLE BATTERY, ELECTRODE ASSEMBLY AND METHOD FOR MANUFACTURING THE SAME

(71) Applicant: Samsung SDI Co., Ltd., Yongin-si (KR)

(72) Inventors: Chanjin Choi, Yongin-si (KR); Gisung Kim, Yongin-si (KR); Jae Kyung Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 256 days.

(21) Appl. No.: 16/345,206

(22) PCT Filed: Nov. 17, 2017

(86) PCT No.: PCT/KR2017/013088
§ 371 (c)(1),
(2) Date: Apr. 25, 2019

(87) PCT Pub. No.: WO2018/093194
PCT Pub. Date: May 24, 2018

(65) Prior Publication Data
US 2019/0296319 A1    Sep. 26, 2019

(30) Foreign Application Priority Data

Nov. 18, 2016 (KR) .......................... 10-2016-0153900

(51) Int. Cl.
*H01M 10/0583* (2010.01)
*H01M 10/04* (2006.01)
(Continued)

(52) U.S. Cl.
CPC ....... *H01M 10/0583* (2013.01); *H01M 10/04* (2013.01); *H01M 10/0459* (2013.01);
(Continued)

(58) Field of Classification Search
CPC .... H01M 50/54; H01M 50/531; H01M 50/46; H01M 10/04; H01M 10/0459; H01M 10/0583; H01M 50/466
See application file for complete search history.

(56) References Cited

U.S. PATENT DOCUMENTS

| 2011/0104567 | A1 | 5/2011 | Lee |
| 2012/0177975 | A1* | 7/2012 | Yageta ............. H01M 10/0413 429/144 |
| 2013/0236767 | A1 | 9/2013 | Nishikawa et al. |
| 2014/0170451 | A1* | 6/2014 | Iwasaki ............. H01M 50/531 429/90 |

(Continued)

FOREIGN PATENT DOCUMENTS

| JP | 2013-254629 A | 12/2013 |
| JP | 2015-53224 A | 3/2015 |

(Continued)

OTHER PUBLICATIONS

Korean Office Action for corresponding Korean Patent No. 10-2279225 (Patent Application No. 10-2016-0153900), dated Sep. 13, 2022, 8 pages.

*Primary Examiner* — Jonathan G Jelsma
(74) *Attorney, Agent, or Firm* — Lewis Roca Rothgerber Christie LLP

(57) ABSTRACT

A rechargeable battery, an electrode assembly, and an electrode assembly manufacturing method are disclosed. The electrode assembly includes: a separator configured to include a first insertion portion formed in a first direction and a second insertion portion formed in a second direction, which are alternatively stacked; a first electrode inserted into the first insertion portion; a second electrode inserted into the second insertion portion while the separator is disposed between the first electrode and the second electrode; a sealing portion configured to bond opposite surfaces of the separator into which the first electrode and the second electrode are inserted with the separator interposed therebetween; and a lead tab configured to include a first current (Continued)

collecting tab connected to the first electrode and a second current collecting tab connected to the second electrode.

7 Claims, 12 Drawing Sheets

(51) Int. Cl.
  *H01M 50/54* (2021.01)
  *H01M 50/46* (2021.01)
  *H01M 50/466* (2021.01)
(52) U.S. Cl.
  CPC ......... *H01M 50/46* (2021.01); *H01M 50/466* (2021.01); *H01M 50/54* (2021.01)

(56) References Cited

U.S. PATENT DOCUMENTS

2015/0111095 A1* 4/2015 Sato .................. H01M 10/0583
                                                          429/186
2015/0180082 A1* 6/2015 Jung .................. H01M 10/0583
                                                          429/246

FOREIGN PATENT DOCUMENTS

| KR | 1997-0067970 A | 10/1997 |
| KR | 10-1084075 B1 | 11/2011 |
| KR | 10-2013-0041188 A | 4/2013 |
| KR | 10-2013-0101101 A | 9/2013 |
| KR | 10-1562345 B1 | 10/2015 |
| KR | 10-2016-0016173 A | 2/2016 |
| KR | 10-1590991 B1 | 2/2016 |

\* cited by examiner

RECHARGEABLE BATTERY, ELECTRODE ASSEMBLY AND METHOD FOR MANUFACTURING THE SAME

CROSS-REFERENCE TO RELATED APPLICATION(S)

This application is a National Phase patent application of International Patent Application Number PCT/KR2017/013088, filed on Nov. 17, 2017, which claims priority of Korean Patent Application No. 10-2016-0153900, filed Nov. 18, 2016. The entire contents of all of which are incorporated herein by reference.

TECHNICAL FIELD

The present invention relates to a rechargeable battery, an electrode assembly, and a manufacturing method of the electrode assembly, which have no risk of short-circuiting and are improved in stability.

BACKGROUND ART

A rechargeable battery differs from a primary battery in that it can be repeatedly charged and discharged, while the latter is incapable of being recharged. Low-capacity rechargeable batteries are used in portable electronic devices such as mobile phones, laptop computers and camcorders, and large capacity batteries are widely used as power sources for driving a motor such as for hybrid vehicles.

The rechargeable battery includes a nickel cadmium (NiCd) battery, a nickel hydrogen (NiMH) battery, a lithium (Li) battery, and a lithium ion (Li ion) rechargeable battery. In particular, the lithium ion rechargeable batteries are about three times higher in operating voltage than the nickel cadmium batteries or nickel hydride batteries, which are widely used as power sources for portable electronic equipment. Further, it is widely used because of its high energy density per unit weight.

The rechargeable battery mainly uses a lithium-based oxide as a positive active material and a carbonaceous material as a negative active material. The rechargeable batteries are classified into liquid electrolyte batteries and polymer electrolyte batteries depending on a type of electrolyte, and a battery using a liquid electrolyte is referred to as a lithium ion battery, while a battery using a polymer electrolyte is referred to as a lithium polymer battery.

In the case where the electrode assembly is implemented as a stacked type, the rechargeable battery may be deteriorated in stability due to a short circuit caused by changes in positions where a positive electrode and a negative electrode are stacked when a vibration is transferred thereto by external impact.

DISCLOSURE

Technical Problem

An exemplary embodiment of the present invention has been made in an effort to provide a rechargeable battery, an electrode assembly, and an electrode assembly manufacturing method in which a short circuit due to an external impact does not occur.

Technical Solution

An exemplary embodiment of the present invention includes: a separator configured to include a first insertion portion formed in a first direction and a second insertion portion formed in a second direction, which are alternatively stacked; a first electrode inserted into the first insertion portion; a second electrode inserted into the second insertion portion while the separator is disposed between the first electrode and the second electrode; a sealing portion configured to bond opposite surfaces of the separator into which the first electrode and the second electrode are inserted with the separator interposed therebetween; and a lead tab configured to include a first current collecting tab connected to the first electrode and a second current collecting tab connected to the second electrode.

The separator may be formed as a continuous zigzag type between the first electrode and the second electrode, the separator in which the first insertion portion and the second insertion portion are alternatively formed.

The sealing portion may bond opposite surfaces of the separator with the first electrode interposed therebetween at the first insertion portion.

The sealing portion may bond opposite surfaces of the separator with the second electrode interposed therebetween at the second insertion portion.

The sealing portion may bond edges of the separator in which the first electrode and the second electrode are stacked in plural.

The sealing portion may bond each edge of the separator of an uppermost side and a lowermost side on which the first electrode, the second electrode and the separator are stacked.

The sealing portions may bond the separator by using at least one of thermal welding, ultrasonic wave welding, laser bonding, and an adhesive.

An exemplary embodiment of the present invention includes: a case configured to accommodate the electrode assembly; a first electrode lead connected to the first current collecting tab; and a second electrode lead connected to the second current collecting tab.

An exemplary embodiment of the present invention includes: (a) providing a separator between a first electrode and a second electrode in a continuous zigzag type; and (b) sealing opposite side surfaces of the separator with the first electrode or the second electrode of the step (a) interposed therebetween.

The step (b) may include sealing opposite side surfaces of the separator with the first electrode interposed therebetween by using a first sealer and a second sealer.

The step (b) may include sealing opposite side surfaces of the separator with the second electrode interposed therebetween by using a first sealer and a second sealer.

The step (b) may include sealing each edge of the separator of an uppermost side and a lowermost side on which the first electrode, the second electrode and the separator are stacked.

In the step (b), the separator may be sealed by using at least one of thermal welding, ultrasonic wave welding, laser bonding, and an adhesive.

According to the exemplary embodiment of the prevent invention, the separator may be sealed at the upper side of the negative electrode or the positive electrode in the process of stacking the negative electrode and the positive electrode while interposing the separator therebetween, to prevent a positive change of the negative electrode or the positive electrode, thereby improving stability.

Advantageous Effects

MODE FOR INVENTION

Figure 1:
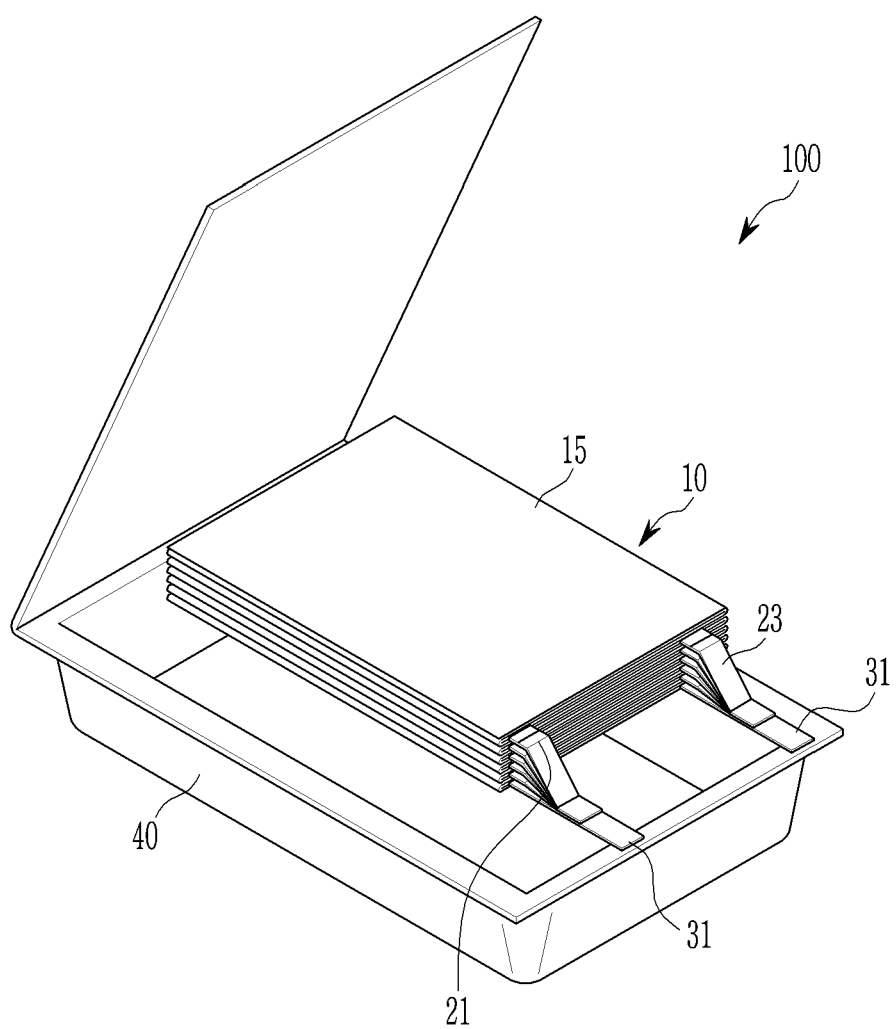
FIG. 1 illustrates a schematic perspective view of a rechargeable battery according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Throughout this specification and the claims that follow, when it is described that an element is "coupled/connected" to another element, the element may be "directly coupled/connected" to the other element or "indirectly coupled/connected" to the other element through a third element. In addition, unless explicitly described to the contrary, the word "comprise" and variations such as "comprises" or "comprising" will be understood to imply the inclusion of stated elements but not the exclusion of any other elements.

Throughout this specification and the claims that follow, it will be understood that when an element such as a layer, film, region, or substrate is referred to as being "on" another element, it can be directly on the other element or intervening elements may also be present. Further, in the specification, the word "~on" or "~over" means positioning on or below the object portion, and does not essentially mean positioning on the upper side of the object portion based on a gravity direction.

Figure 2:
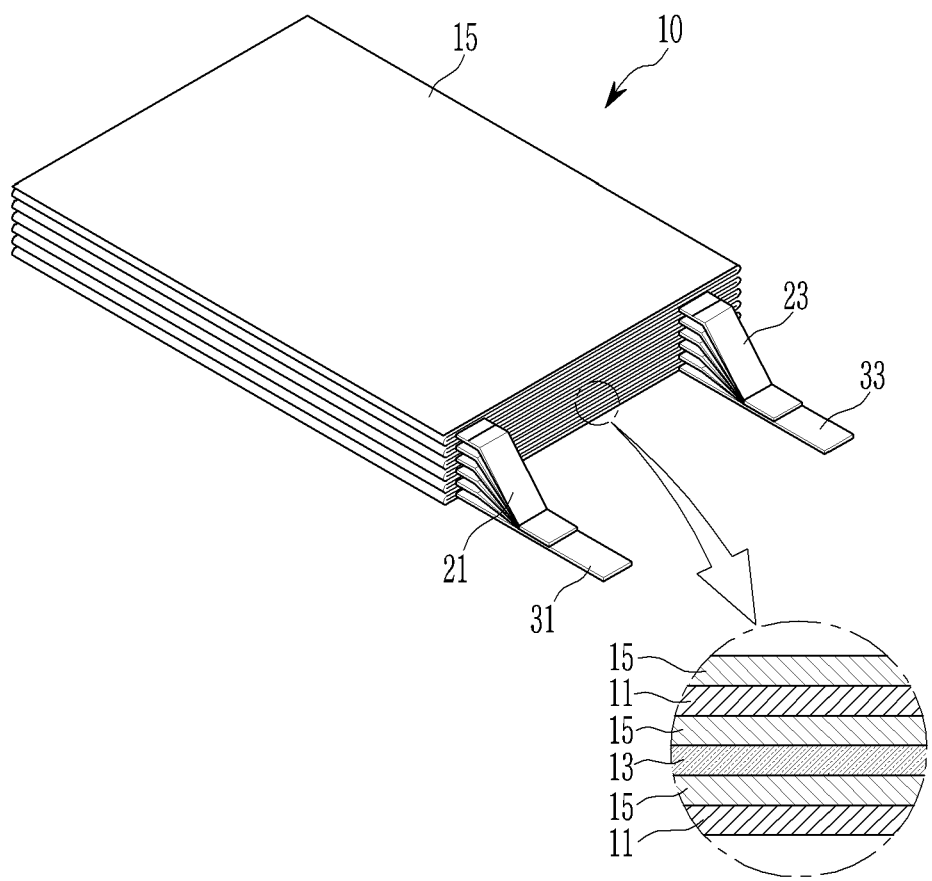
FIG. 2 illustrates a schematic perspective view of the electrode assembly of FIG. 1.
Figure 3:
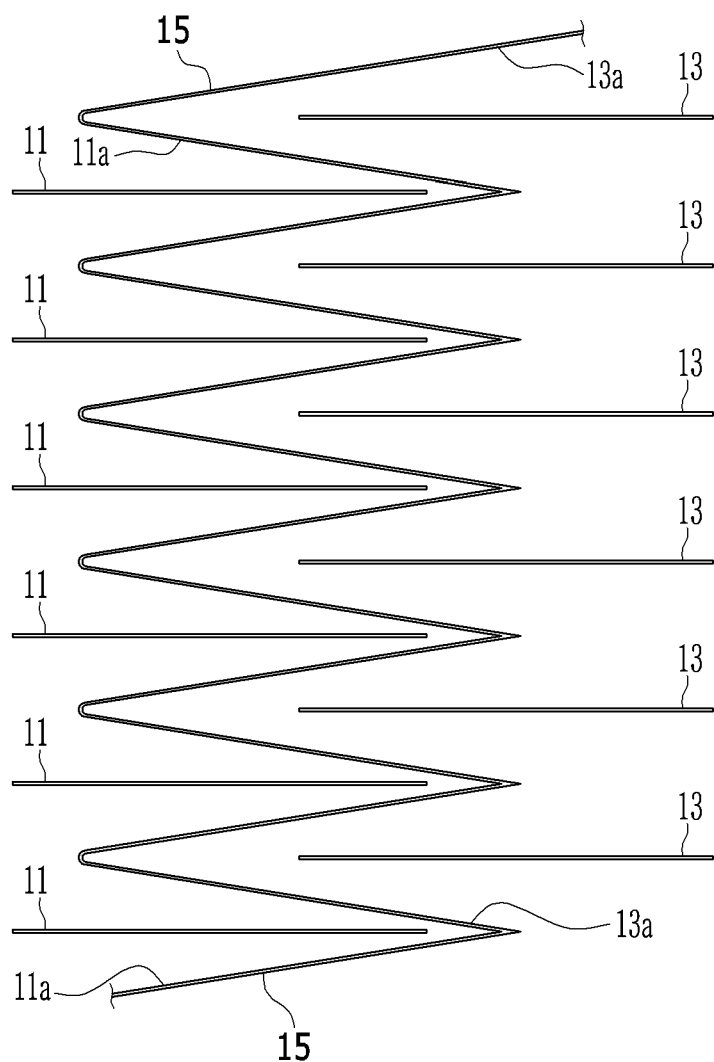
FIG. 3 schematically illustrates main parts of a separator, a first electrode, and a second electrode which are disposed in a state where a portion of the electrode assembly of FIG. 2 is unfolded.

FIG. 1 illustrates a schematic perspective view of a rechargeable battery according to an exemplary embodiment of the present invention, FIG. 2 illustrates a schematic perspective view of the electrode assembly of FIG. 1, and FIG. 3 schematically illustrates main parts of a separator, a first electrode, and a second electrode which are disposed in a state where a portion of the electrode assembly of FIG. 2 is unfolded.

As illustrated in FIG. 1 to FIG. 3, according to a first exemplary embodiment of the present invention, a rechargeable battery 100 includes an electrode assembly 10 configured to including a separator 15, a first electrode 11, and a second electrode 13; a case 40 configured to accommodate the electrode assembly 10 therein; lead tabs 21 and 23 configured to include a first current collecting tab 21 connected with the first electrode 11, and a second current collecting tab 23 connected with the second electrode 13; a first electrode lead 31 connected with the first current collecting tab 21; and a second electrode lead 33 connected with the second current collecting tab 23.

For example, in the electrode assembly 10, the first electrode (hereinafter referred to as a "negative electrode") 11 and the second electrode (hereinafter referred to as a "positive electrode") 13 may be disposed on opposite surfaces of the separator 15, and the negative electrode 11, the separator 15, and the positive electrode 13 may be folded a predetermined number of times in a zigzag form.

In the present exemplary embodiment, the electrode assembly 10 may be formed to have a zigzag shape by stacking the negative electrode 11 and the positive electrode 13 which are respectively inserted into spaces formed by folding the separator 15 the predetermined number of times.

In other words, the negative electrode 11 and the positive electrode 13, which are disposed at opposite sides of the separator 15, may be respectively inserted into first insertion portions 11a and second insertion portions 13a formed in the separator 15 that is bent in the zigzag shape.

The negative electrode 11 is disposed on one side of the separator 15, and the first current collecting tab 21 (hereinafter referred to as "negative electrode current collecting tab") is connected to an uncoated region thereof. The negative electrode current collecting tab 21 is connected to each negative electrode 13, and is installed to connect the negative electrode 11 to the first electrode lead 31.

This negative electrode 11 may be disposed inside of the first insertion portions 11a formed in the spaces between portions of the separator 15 that are bent in the zigzag form. The negative electrode 11 may be formed by a stamping operation process by a press or the like, and a plurality of negative electrodes 11 may be disposed on a side surface of the separator 15.

The positive electrode 13 may be disposed on the other side of the separator 15 at a position opposite to the negative electrode 11 with the separator 15 therebetween.

The positive electrode 13 may be disposed on the side surface of the separator 15 in a rectangular shape by a punching operation process. Although the positive electrode is described to be formed to have a rectangular shape in the present exemplary embodiment as an example, the present invention is not limited thereto, and the positive electrode 13 may be formed in various shapes such as a round shape in a portion thereof.

The positive electrode 13 may be disposed inside of the second insertion portions 13a formed in the spaces between portions of the separator 15 that are bent in the zigzag form. The negative electrode 11 may be formed by a stamping operation process by a press or the like, and a plurality of negative electrodes 11 may be disposed on a side surface of the separator 15.

The positive electrode 13 may include a plurality of positive electrodes 13, which are disposed on the side surface of the separator 15 in a state of being spaced apart from each other, and the second current collecting tab 23 may be connected thereto at each edge in a protruding manner.

As such, the negative electrode 11 and the positive electrode 13, which are disposed at opposite sides of the separator 15, may be respectively inserted into the first insertion portions 11a and the second insertion portions 13a formed in the separator 15 that is bent in the zigzag shape.

The first inserting portion 11a indicates a portion formed on one side surface of the separator 15 that is bent in the zigzag form, into which the negative electrode 11 is to be inserted. Similarly, the second insertion portion 13a indicates a portion formed on the other surface of the separator 15 that is bent in the zigzag form, into which the positive electrode 13 is to be inserted.

Meanwhile, the opposite surfaces of the separator 15 may be bonded to each other by a sealing portion 20 in a process of inserting the negative electrode 11 and the positive electrode 13 into the first insertion portion 11a and the second insertion portion 13a, respectively. This will be described in detail below.

Figure 4:
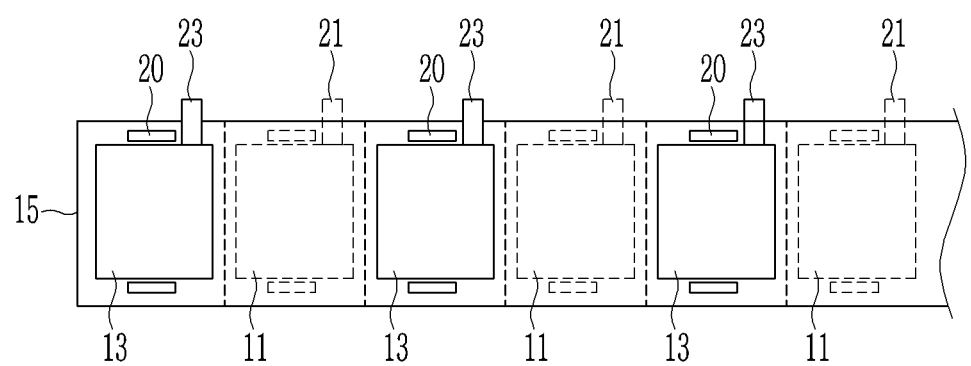
FIG. 4 illustrates a top plan view schematically showing that a sealing portion is formed at an upper portion and a lower portion of a negative electrode in a state where a portion of an electrode assembly according to a first exemplary embodiment of the present invention is unfolded.
Figure 5:
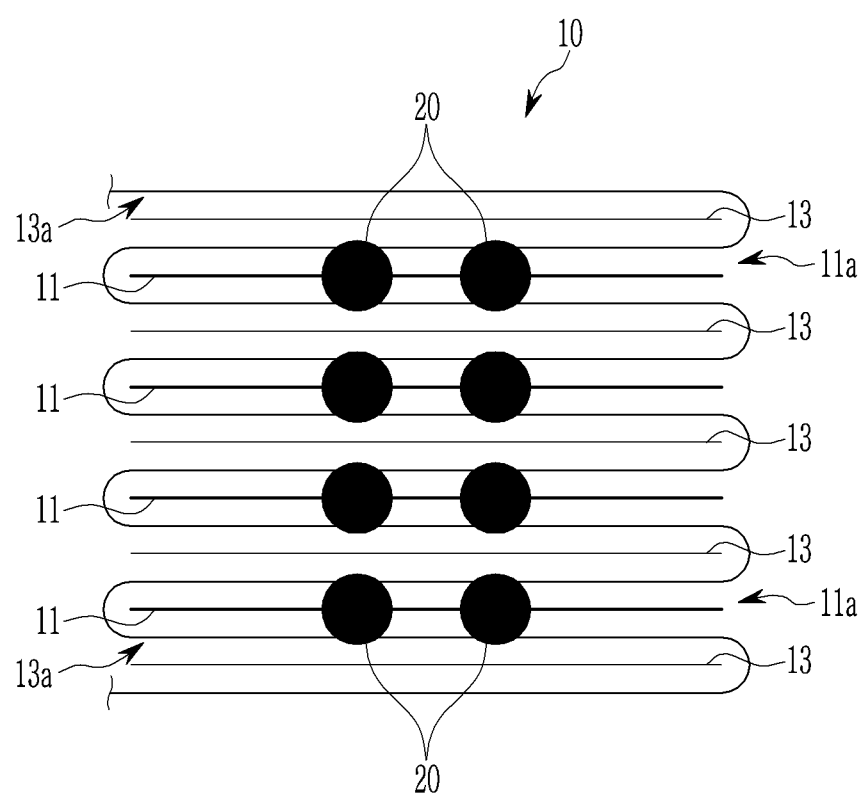
FIG. 5 illustrates a side view schematically showing main parts of the electrode assembly according to the first exemplary embodiment of the present invention in which the sealing portion is formed.

FIG. 4 illustrates a top plan view schematically showing that a sealing portion is formed at an upper portion and a lower portion of a negative electrode in a state where a portion of an electrode assembly according to a first exemplary embodiment of the present invention is unfolded, and FIG. 5 illustrates a side view schematically showing main parts of the electrode assembly according to the first exemplary embodiment of the present invention in which the sealing portion is formed.

As illustrated in FIG. 4 and FIG. 5, the negative electrode 11 may be stacked in a state where the negative electrode 11 is inserted into the zigzag bent surface of the first inserting portion 11a. Herein, the opposite side surfaces of the separator 15 at an upper side and a lower side of the negative electrode 11 with the negative electrode 11 therebetween may be bonded to each other by the sealing portion 20.

The sealing portion 20 bonds the upper side and the lower side of the negative electrode 11 at an open side of the first insertion portion 11a in the separator 15, and thus the negative electrode 11 may be restrained in a state in which a position thereof is fixed inside of the first insertion portion 11a. Accordingly, the negative electrode 11 is stably positioned in the first inserting portion 11a by the sealing portion 20 even when vibration is generated by an impact from the outside of the rechargeable battery 100, and thus it is possible to effectively prevent a short circuit caused by a change in a position of the negative electrode 11.

The sealing portion 20 is exemplarily illustrated as being bonded to the opposite side surfaces of the separator 15 by thermal welding in the present exemplary embodiment.

However, the bonding of the sealing portion 20 is not necessarily limited to thermal welding, and may be applied to any one of ultrasonic wave welding, laser bonding, and an adhesive.

As described above, in the electrode assembly 10 of the secondary battery 100 of the present exemplary embodiment, the negative electrode 11 and the positive electrode 13 are stacked with the separator 15 interposed therebetween, while the separator 15 is provided in a zigzag staggered manner.

Herein, since the opposite surfaces of the separators 15 with the negative electrode 11 or the positive electrode 13 therebetween are bonded to each other, the negative electrodes 11 and the positive electrodes may be stably positioned. Therefore, the negative electrode 11 and positive electrode 13 may be prevented from being shifted to suppress a short circuit, thereby improving stability of the rechargeable battery 100.

Figure 6:
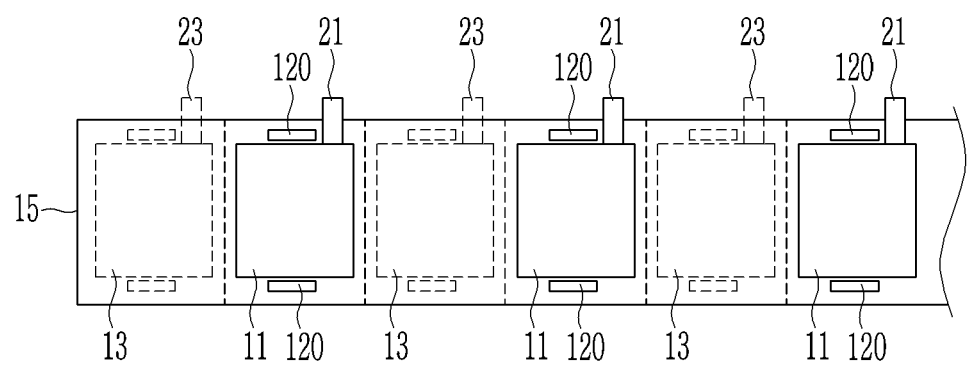
FIG. 6 illustrates a top plan view schematically showing that a sealing portion is formed at an upper portion and a lower portion of a positive electrode in a state where a portion of the electrode assembly according to a second exemplary embodiment of the present invention is unfolded.
Figure 7:
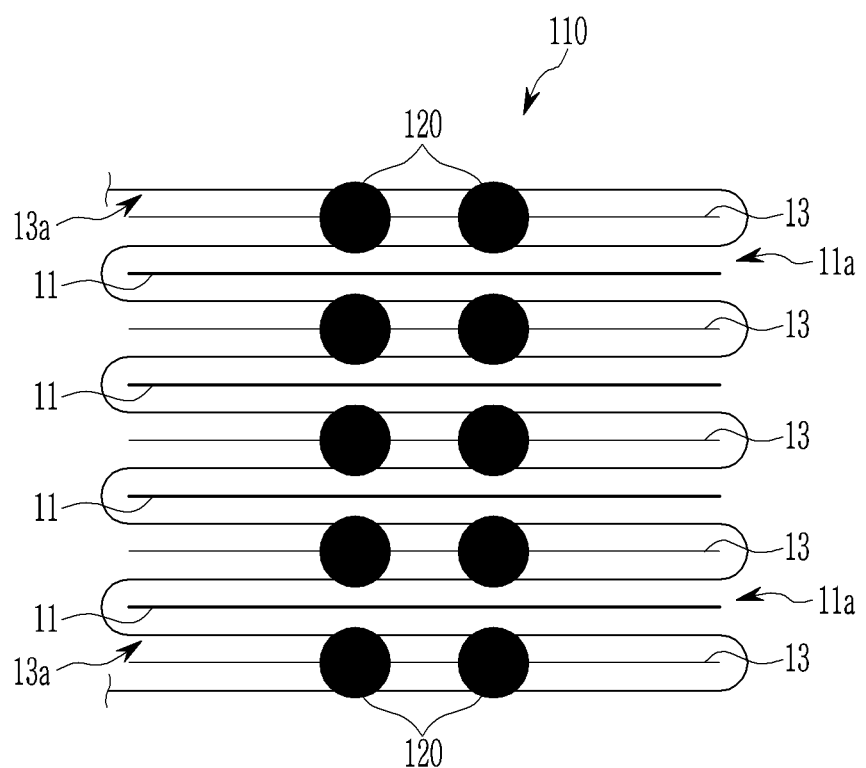
FIG. 7 illustrates a side view schematically showing main parts of the electrode assembly according to the second exemplary embodiment of the present invention in which the sealing portion is formed.

FIG. 6 illustrates a top plan view schematically showing that a sealing portion is formed at an upper portion and a lower portion of a positive electrode in a state where a portion of the electrode assembly according to a second exemplary embodiment of the present invention is unfolded, and FIG. 7 illustrates a side view schematically showing main parts of the electrode assembly according to the second exemplary embodiment of the present invention in which the sealing portion is formed. The same reference numerals as those of FIG. 1 to FIG. 5 denote the same or similar members having the same or similar functions. Hereinafter, detailed descriptions of the same reference numerals will be omitted.

As illustrated in FIG. 6 and FIG. 7, according to the second exemplary embodiment of the prevent invention, a sealing portion 120 of an electrode assembly 110 seals an upper portion and a lower portion of the positive electrode 13 inserted into the second insertion portion 13a on the zigzag-bent surface of the separator 15.

Accordingly, the positive electrode 13 is stably positioned in the second insertion portion 13a by the sealing portion 120 even when vibration is generated by an impact from the outside of the rechargeable battery 100, and thus it is possible to effectively prevent a short circuit caused by a change in a position of the positive electrode 13.

Figure 8:
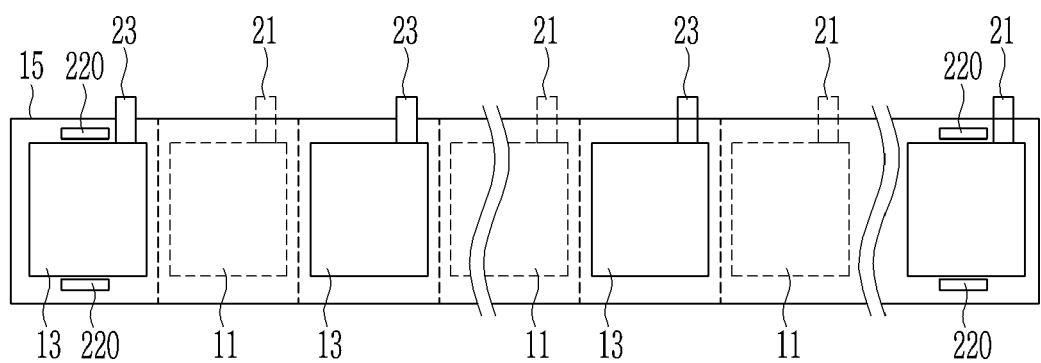
FIG. 8 illustrates a top plan view schematically showing that a sealing portion is formed in a state where a portion of the electrode assembly according to a third exemplary embodiment of the present invention is unfolded.
Figure 9:
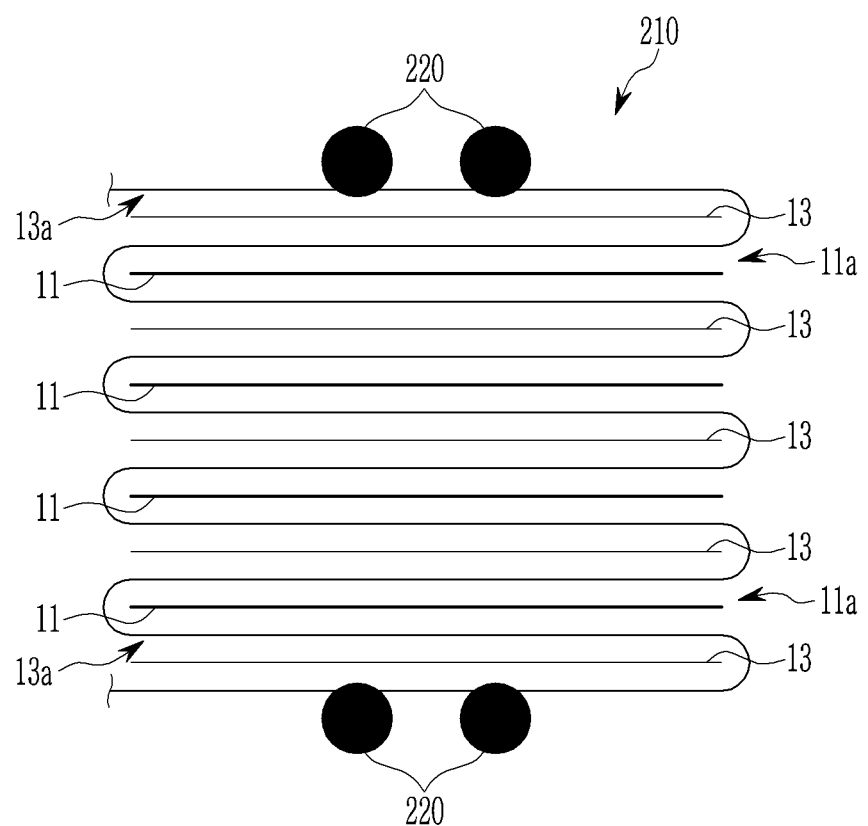
FIG. 9 illustrates a side view schematically showing main parts of the electrode assembly according to the third exemplary embodiment of the present invention in which the sealing portion is formed.

FIG. 8 illustrates a top plan view schematically showing that a sealing portion is formed in a state where a portion of the electrode assembly according to a third exemplary embodiment of the present invention is unfolded, and FIG. 9 illustrates a side view schematically showing main parts of the electrode assembly according to the third exemplary embodiment of the present invention in which the sealing portion is formed. The same reference numerals as those of FIG. 1 to FIG. 7 denote the same or similar members having the same or similar functions. Hereinafter, detailed descriptions of the same reference numerals will be omitted.

As illustrated in FIG. 8 and FIG. 9, according to the third exemplary embodiment of the present invention, in a sealing portion 220 of an electrode assembly 210 an upper edge portion and a lower edge portion of the zigzag-bent separator 15 are bonded in a state where the negative electrode 11 and the positive electrode 13 are respectively disposed inside of the first insertion portion 11a and the second insertion portion 13a.

As a result, according to the present exemplary embodiment, the electrode assembly 210 may effectively prevent a short circuit caused by changes in positions where the negative electrode 11 and the positive electrode 13 are stacked when a vibration is transferred thereto by external impact, by connecting the upper edge portion and the lower edge portion of the separator 15 in a state where the separator 15, the negative electrode 11, the positive electrode 13 are stacked as unit bodies.

Figure 10:
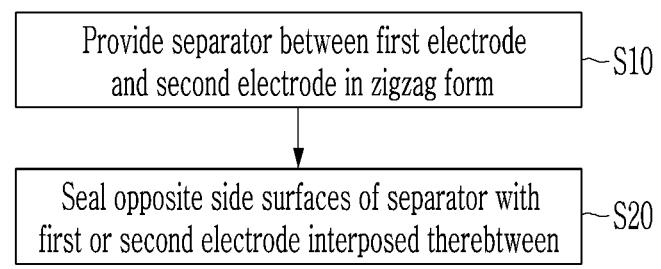
FIG. 10 illustrates a flowchart schematically showing an electrode assembly manufacturing method according to the first exemplary embodiment of the present invention.
Figure 11:
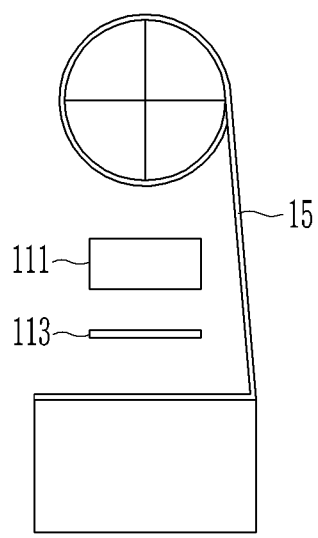
FIG. 11 illustrates a side view schematically showing a state in which a first sealer and a second sealer of FIG. 10 are installed.

FIG. 10 illustrates a flowchart schematically showing an electrode assembly manufacturing method according to the first exemplary embodiment of the present invention, and FIG. 11 illustrates a side view schematically showing a state in which a first sealer and a second sealer of FIG. 10 are installed. The same reference numerals as those of FIG. 1 to FIG. 9 denote the same or similar members having the same or similar functions. Hereinafter, detailed descriptions of the same reference numerals will be omitted. Hereinafter, a rechargeable battery manufacturing method will be described in detail below.

First, the first electrode 11 and the second electrode 13 are provided with the separator 15 interposed therebetween (S10). Hereinafter, the first electrode 11 serves as a negative electrode, and the second electrode 13 serves as a positive electrode.

The separator 15 in step S10 may be provided in a continuous zigzag fashion between the first electrode 11 and the second electrode 13.

Herein, the first electrode 11 may be provided to the first inserting portion 11a formed on one side of the zigzag bent portion of the separator 15, and the second electrode 13 may be provided to the second insertion portion 13a formed on the other side of the zigzag bent portion of the separator 15.

Next, side surfaces of the separator 15 are sealed at an edge portion of the separator 15 with the first electrode 11 or the second electrode 13 interposed therebetween. For this purpose, a first sealer 111 and a second sealer 113 may be provided with the first electrode 11 or the second electrode 13 interposed therebetween, to bond the separator 15 with the upper and lower portions of the first electrode 11 or the second electrode 13.

In step S20, the side surfaces of the separator 15 may be sealed at the upper portion and the lower portion of the first electrode 11 or the second electrode 13 in a state where the first electrode 11 and the second electrode 13 are respectively disposed inside of the first electrode 11 and the positive electrode 13 formed on one side and the other side of the separator 15 bent in a zigzag shape.

In the present exemplary embodiment, step S20 is exemplarily illustrated as sealing the separator 15 at the upper portion and the lower portion of the first electrode 11 by the sealing portion 20 formed by using the first sealer 111 and the second sealer 113. However, the sealing portion 20 is not necessarily limited to sealing the upper portion and the lower portion of the first electrode 11, and the upper portion and the lower portion of the second electrode 13 may be sealed by using the first sealer 111 and the second sealer 113.

Herein, in step S20, the sealing of the separator 15 may be performed by using thermal welding, ultrasonic wave welding, laser bonding, or an adhesive.

Figure 12:
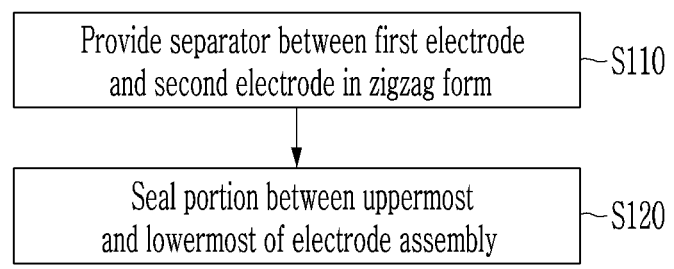
FIG. 12 illustrates a flowchart schematically showing an electrode assembly manufacturing method according to the second exemplary embodiment of the present invention.

FIG. 12 illustrates a flowchart schematically showing an electrode assembly manufacturing method according to the second exemplary embodiment of the present invention. The same reference numerals as those of FIG. 1 to FIG. 11 denote the same or similar members having the same or similar functions. Hereinafter, detailed descriptions of the same reference numerals will be omitted. Hereinafter, a rechargeable battery manufacturing method will be described in detail below.

First, the first electrode 11 and the second electrode 13 are provided with the separator 15 interposed therebetween (S110). The separator 15 in step S110 may be provided in a continuous zigzag fashion between the first electrode 11 and the second electrode 13.

Next, an uppermost edge portion and the lowermost edge portion of the separator 15 that is bent in the zigzag shape are sealed with each other in the electrode assembly 10 in which the first electrode 11 and the second electrode 13 are stacked as a unit body with the separator 15 interposed therebetween (S120).

That is, the sealing may be performed in a state where the first electrode 11 and the second electrode 13 are disposed inside of the separator 15, by respectively disposing the first sealer 111 and the second sealer 113 at an uppermost end and a lowermost side of the electrode assembly 10.

As such, since the sealing is performed between the uppermost end and the lowermost end of the separator 15 in a state where electrode assemblies 10 are stacked as a unit body, the first electrode 11 and the second electrode 13 may be stably stacked so as to prevent short circuit occurrence.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10 . . . electrode assembly 11 . . . negative electrode
11a . . . first insertion portion 13 . . . positive electrode
13a . . . second insertion portion 15 . . . separator
20 . . . sealing portion 21 . . . first current collecting tab
23 . . . second current collecting tab 31 . . . first electrode Lead
33 . . . second electrode lead 111 . . . first sealer
113 . . . second sealer

The invention claimed is:

1. An electrode assembly comprising:
a separator configured to include a first insertion portion formed in a first direction and a second insertion portion formed in a second direction, which are alternately stacked;
a first electrode inserted into the first insertion portion;
a second electrode inserted into the second insertion portion while the separator is disposed between the first electrode and the second electrode;
a sealing portion configured to bond opposite surfaces of the separator at a first upper side and a first lower side of the first electrode into which the first electrode is inserted therebetween; and
a lead tab configured to include a first current collecting tab connected to the first electrode and a second current collecting tab connected to the second electrode,
wherein the first current collecting tab includes a first portion covered with the separator and a second portion drawn out of the separator, and the first current collecting tab is drawn out in a third direction different from the first direction,
wherein the second current collecting tab includes a fourth portion covered with the separator and a fifth portion drawn out of the separator, and the second current collecting tab is drawn out in a fourth direction different from the second direction, and
wherein the sealing portion is disposed on a first side of the separator from which the first current collecting tab is drawn out, and is further disposed on a second side of the separator opposite from the first side and opposite of the third direction.

2. The electrode assembly of claim 1, wherein the separator is formed as a continuous zigzag type between the first electrode and the second electrode, the separator in which the first insertion portion and the second insertion portion are alternately formed.

3. The electrode assembly of claim 2, wherein
the sealing portion bonds opposite surfaces of the separator with the first electrode interposed therebetween at the first insertion portion.

4. The electrode assembly of claim 2, wherein the sealing portion bonds edges of the separator in which the first electrode and the second electrode are stacked in plural.

5. The electrode assembly of claim 1, wherein the sealing portion bonds the separator by using an adhesive.

6. A rechargeable battery comprising:
a case configured to accommodate the electrode assembly according to claim 1;
a first electrode lead connected to the first current collecting tab; and
a second electrode lead connected to the second current collecting tab.

7. An electrode assembly comprising:
a separator configured to include a first insertion portion formed in a first direction and a second insertion portion formed in a second direction, which are alternately stacked, wherein the separator is formed as a continuous zigzag type between a first electrode and a second electrode, the separator in which the first insertion portion and the second insertion portion are alternately formed;
the first electrode inserted into the first insertion portion;
the second electrode inserted into the second insertion portion while the separator is disposed between the first electrode and the second electrode;
a sealing portion configured to bond opposite surfaces of the separator at a first uppermost side and a second lowermost side of the separator into which the first electrode and the second electrode are inserted therebetween; and
a lead tab configured to include a first current collecting tab connected to the first electrode and a second current collecting tab connected to the second electrode,
wherein the first current collecting tab includes a first portion covered with the separator and a second portion drawn out of the separator, and the first current collecting tab is drawn out in a third direction different from the first direction,
wherein the second current collecting tab includes a third portion covered with the separator and a fourth portion drawn out of the separator, and the second current collecting tab is drawn out in a fourth direction different from the second direction,
wherein the sealing portion bonds first edges of the separator at the first uppermost side with second edges of the separator at the second lowermost side, wherein the first edges and the second edges are respectively disposed on a first side of the separator from which the first current collecting tab is drawn out, and is further disposed on a second side of the separator opposite from the first side and opposite of the third direction,
wherein the first electrode and the second electrode are stacked between the uppermost side and the lowermost side, inside respectively the first insertion portion and the second insertion portion.

* * * * *